United States Patent [19]

Brandes

[11] 4,148,685
[45] Apr. 10, 1979

[54] PROCESS AND APPARATUS FOR SHUTDOWN AND CONTROL OF A GAS-COOLED NUCLEAR REACTOR

[75] Inventor: Siegfried Brandes, Schriesheim, Fed. Rep. of Germany

[73] Assignee: Hochtemperatur-Reaktorbau GmbH, Cologne, Fed. Rep. of Germany

[21] Appl. No.: 780,046

[22] Filed: Mar. 22, 1977

[30] Foreign Application Priority Data

Mar. 23, 1976 [DE] Fed. Rep. of Germany ....... 2612178

[51] Int. Cl.² .............................................. G21C 7/08
[52] U.S. Cl. .............................. 176/36 R; 176/58 PB
[58] Field of Search ............... 176/36 R, 58 PB, 86 R

[56] References Cited

U.S. PATENT DOCUMENTS

| 3,151,034 | 9/1964 | Douglass, Jr. et al. | 176/86 R |
|---|---|---|---|
| 3,519,536 | 7/1970 | Rausch | 176/86 R |
| 3,997,392 | 12/1976 | Brandes et al. | 176/36 R |
| 4,030,974 | 6/1977 | Neef | 176/58 PB |

FOREIGN PATENT DOCUMENTS

| 1263939 | 3/1968 | Fed. Rep. of Germany | 176/36 R |
|---|---|---|---|
| 2123894 | 12/1972 | Fed. Rep. of Germany | 176/58 PB |
| 2353653 | 5/1975 | Fed. Rep. of Germany | 176/36 R |

Primary Examiner—Samuel W. Engle
Assistant Examiner—S. A. Cangialosi
Attorney, Agent, or Firm—Schwartz, Jeffery, Schwaab, Mack, Blumenthal & Koch

[57] ABSTRACT

Disclosed are a method and apparatus for regulating and shutting down a gas cooled nuclear reactor having a bed of spherical fuel elements, wherein regulation of the reactor is accomplished by a first set of absorber rods in the side reflector of the reactor, partial shutdown is achieved by a second set of absorber rods movable in the top reflector and in the space above the fuel elements, and total shutdown is accomplished by a third independent set of absorber rods which can be moved downwardly into the fuel elements.

9 Claims, 4 Drawing Figures

PROCESS AND APPARATUS FOR SHUTDOWN AND CONTROL OF A GAS-COOLED NUCLEAR REACTOR

BACKGROUND OF THE INVENTION

The present invention relates to a process and apparatus for shutdown and control of a nuclear reactor, and more especially to a process and apparatus for the shutdown and control of a gas-cooled nuclear reactor, in which the coolant gas is passed through from the top to the bottom of the core which is formed by a pile of spherical fuel elements and the fuel elements have reached the desired final burn-up afer one pass through the pile, and in which the core is surrounded by a reflector, consisting of a top reflector, a cylindrical side reflector and a bottom reflector, and which also embodies devices for afterheat removal.

There is known a gas-cooled nuclear reactor having a core consisting of a pile of spherical fuel elements which for control and adjustment processes is equipped with core absorber rods and with movable absorber rods in the side reflector (hereinafter also called core rods and reflector rods, respectively). This reactor is known as high temperature reactor THTR-300. In this reactor type, the core rods and the reflector rods are used for start-up, i.e., for the control of renewed start-up of the reactor after shutdowns. The core rods are provided for partial or rapid shutdown (scram) and for total or long-term shutdown. The manner in which the reactor is abruptly changed to subcritical status by means of a rapid introduction of negative reactivity is designated as partial or rapid shutdown of the reactor (scram).

When a rapid shutdown becomes necessary, in the event of a possible malfunction, the core rods are inserted to a predetermined position at such a speed that the reaction immediately reaches a subcritical status and can be maintained in this condition over an extended period of time. During this time, malfunctions can be analyzed and removed. It is very desirable that such analysis and removal of a malfunction take place in as short a time period as possible, so that the reactor may be returned to critical status and full power within the period of about one hour, by way of a so-called hot start. However, such a hot start is possible only when the Xenon-135 concentration, which increases during shutdown of the reactor, has not yet reached too high a value by the time the power of the critical reactor is increased again. Otherwise, a new start-up of the reactor is possible only after approximately 24 hours, when the Xenon-135 concentration has subsided through decay.

The time span over which the reactor can be maintained in a subcritical condition through this operating procedure is determined by the value of the shutdown reactivity which is introduced and by the devices for the afterheat removal which are used in the reactor. If it is not possible to repair the damage within a short period of time, a long-term shutdown will subsequently be necessary. For this purpose, the core rods and their adjustment drives are designed so that in the fully inserted position of the rods, they can supply to a reactor the negative reactivity which is necessary for a long-term shutdown.

Thus, the rapid and long-term shutdown will be carried out in the known reactor by one and the same shutdown system, which is formed for both shutdown procedures by the core rods. Reflector rods may additionally be employed in connection with the rapid shutdown, but only to the extent to which they are available and are not already inserted for compensation of excess reactivity resulting from a rapid load adjustment maneuver. They are not included in the shutdown system.

Adjustment of the reactor (as opposed to shutdown) is accomplished by means of the reflector rods which are designed for this purpose. They serve both for the fine adjustment of a predetermined performance level or condition and for any rapid load adjustments involving adjustment of the reactor within predetermined power values defined by the maximum possible power output and a lower power limit. The known reactor has power limits of 100% and 40%. If the power is reduced for example to 40%, the lowered neutron flux results in a reduced capture of Xenon-135, while the Xenon-135 production through iodine disintegration initially continues unabated, so that, after about five hours, a maximum Xenon-135 poisoning is reached. Withdrawal of nearly all inserted reflector rods makes it possible to maintain the reactor in critical status. If the reactor is subsequently operated at 40% partial load for an extended period of time, the Xenon-135 concentration returns to a value which is slightly below the value at full load, because the production of the fission product iodine has adapted itself to the reduced power level, and some of the reflector rods must be again inserted to compensate the excess reactivity. If, after extended partial load, the reactor is rapidly returned to full load, a drop in the Xenon-135 concentration takes place because of the increased capture by neutrons. An overcritical condition of the reactor is prevented by insertion of nearly all reflector rods.

In order to meet the high safety requirements, demanded in the reactor technology, there is provided in the known reactor type a further shutdown system (emergency shutdown system). In this system an absorbing agent, for example, a neutron-absorptive gas such as borontrifluoride is fed into the reactor, or small absorber balls are inserted. The introduction of the absorbing agent is started by hand if the shutdown system, formed by the core absorber rods, is not fully functionable for any reason. In the event of failure of the first shutdown system, the emergency shutdown system automatically comes into operation, in any case. This results in the disadvantage that a longer shutdown of the reactor is necessary, since the absorbing agent which is fed into the reactor core must first be removed from the core.

In another known nuclear reactor utilizing a pile of spherical fuel elements, the arrangement for power adjustment and for control is constructed in such a manner that the absorber rods are insertable through the top reflector up to a predetermined insertion depth into the chamber enclosed within and defined by the reflector (German Offenlegungsschrift No. 2,353,653). This arrangement comprises a portion of the rods for shutdown and a portion of the rods for power adjustment, whereby the portion serving for shutdown of the reactor consists of absorber rods which are insertable into the pile, and the portion serving for the power adjustment is formed by absorber rods which are slidable within the wall of the top reflector and within the space formed between the pile and the top reflector. Thus, these absorber rods are not inserted into the pile, so that no forces opposed to the movement direction of the absorber rods need be overcome during the power adjustment, as is the case when using absorber rods which are inserted directly into the pile. It has been shown that the absorber rods inserted into the space above the pile for adjustment of the nuclear reactor are especially efficient, when the known reactor is operated in such a manner that the combustion elements pass the pile only one time. This is because the axial neutron flux profile in the reactor core shows a maximum in the upper third of the core. That part of the adjustment and control arrangement serving for the shutdown of the reactor can also be used for purposes of adjustment. The thus-affected absorber rods are then formed so that they are also slidable in the wall of the top reflector and into the space between the top reflector and the fuel element pile. This known nuclear reactor has the disadvantage that it is provided with one shutdown system only, so that another shutdown system (emergency shutdown) cannot be put into operation in case of a failure of that part of the adjustment and control arrangement serving for the shutdown. In a nuclear reactor with a single pass of the fuel elements, there is another disadvantage that the side reflector is charged by a neutron dose approximately twice as high as that occurring by multi-pass of the fuel elements. If the side reflector cannot be removed regularly, special measures for the protection of the side reflector must be taken.

Another known nuclear reactor with spherical fuel elements embodies an adjustment and control device which also comprises absorber rods which are insertable directly into the fuel element pile plus adjustment rods arranged in the side reflector (German Offenlegungsschrift No. 2,123,894). However, the adjustment rods are essentially moved only within the top reflector, i.e., they are not inserted into the space between the top reflector and the fuel element pile. Also in this nuclear reactor, there exists only one shutdown system, and the side reflector is exposed to high loads by fast neutrons, as a result of the high power density in the upper third of the reactor core.

Furthermore, reference is made to a nuclear reactor characterized by a single pass of the spherical fuel elements in which are provided measures for the protection of the upper part of the side reflector as well as the top reflector (German Offenlegungsschrift No. 2,347,817). These measures consist in providing agents within the wall of the side reflector which absorb neutrons or decrease the neutron speed. These agents can be rod-shaped and can be arranged in corresponding recesses. It is not known in which manner the shutdown and the adjustment are handled in this nuclear reactor.

SUMMARY OF THE INVENTION

It is an object of the present invention to provide a shutdown and adjustment process of the reactor type described hereinbefore which is improved over the prior art.

Another object is to provide such a process so that the nuclear reactor can be safely shutdown without requiring introduction of absorber agents and absorber gases or absorber balls into the reactor core by means of an emergency shutdown.

Furthermore, it is an object of the invention to provide such a process wherein the side reflector is protected against too high of a dose of fast neutrons, but whereby devices beyond the shutdown and adjustment system are eliminated.

A further object of the invention resides in the provision of a nuclear reactor having a regulation and shutdown system having the foregoing advantages.

In accomplishing these objects, there has been provided according to the invention a method for regulating and shutting-down a gas-cooled nuclear reactor of the type having a core comprising a pile of spherical fuel elements through which the cooling gas passes and which are expended after a single pass through the reactor and having a reflector surrounding the core comprising a top reflector spaced from the top of the fuel element pile to define a space therebetween, a cylindrical side reflector and a bottom reflector, comprising the steps of regulating the operation of the reactor by moving first absorber rods from above into and out of recesses provided in the side reflector, rapidly and partially shutting-down the reactor by inserting second absorber rods downwardly through the top reflector and into the space formed between the top reflector and the fuel element pile, and totally shutting-down the reactor for a long term by inserting third absorber rods, independent from the second absorber rods, downwardly through the top reflector and into the pile of fuel elements.

According to another aspect of the invention, there has been provided a gas-cooled nuclear reactor, comprising a pile of generally spherical fuel elements; a reflector surrounding the fuel element pile, comprising a top reflector spaced from the top of the pile, and generally cylindrical side reflector and a bottom reflector; means for continuously introducing the fuel elements into and removing same from the reactor, means for circulating a cooling gas downwardly through the pile of fuel elements; means, including a plurality of first absorber rods movably contained in recesses in the side reflector, for regulating the operation of the reactor; means, including a plurality of second absorber rods distributed over the area of the top reflector and adapted to be moved through the top reflector into the pile of fuel elements, for rapidly and partially shutting-down the reactor; and means, including a plurality of third absorber rods, independent from the second absorber rods, distributed over the area of the top reflector and adapted to be moved through the top reflector into the space formed between the top reflector and the top of the fuel element pile, for totally shutting-down the reactor for an extended period of time. Preferably, the partial shutdown means comprises means for electrically operating the second absorber rods and means for connecting a plurality of the second absorber rods to one of the operating means.

Further objects, features and advantages of the invention will become apparent from the detailed description of preferred embodiments which follows, when considered with the attached drawings.

DETAILED DESCRIPTION OF PREFERRED EMBODIMENTS

Figure 1:
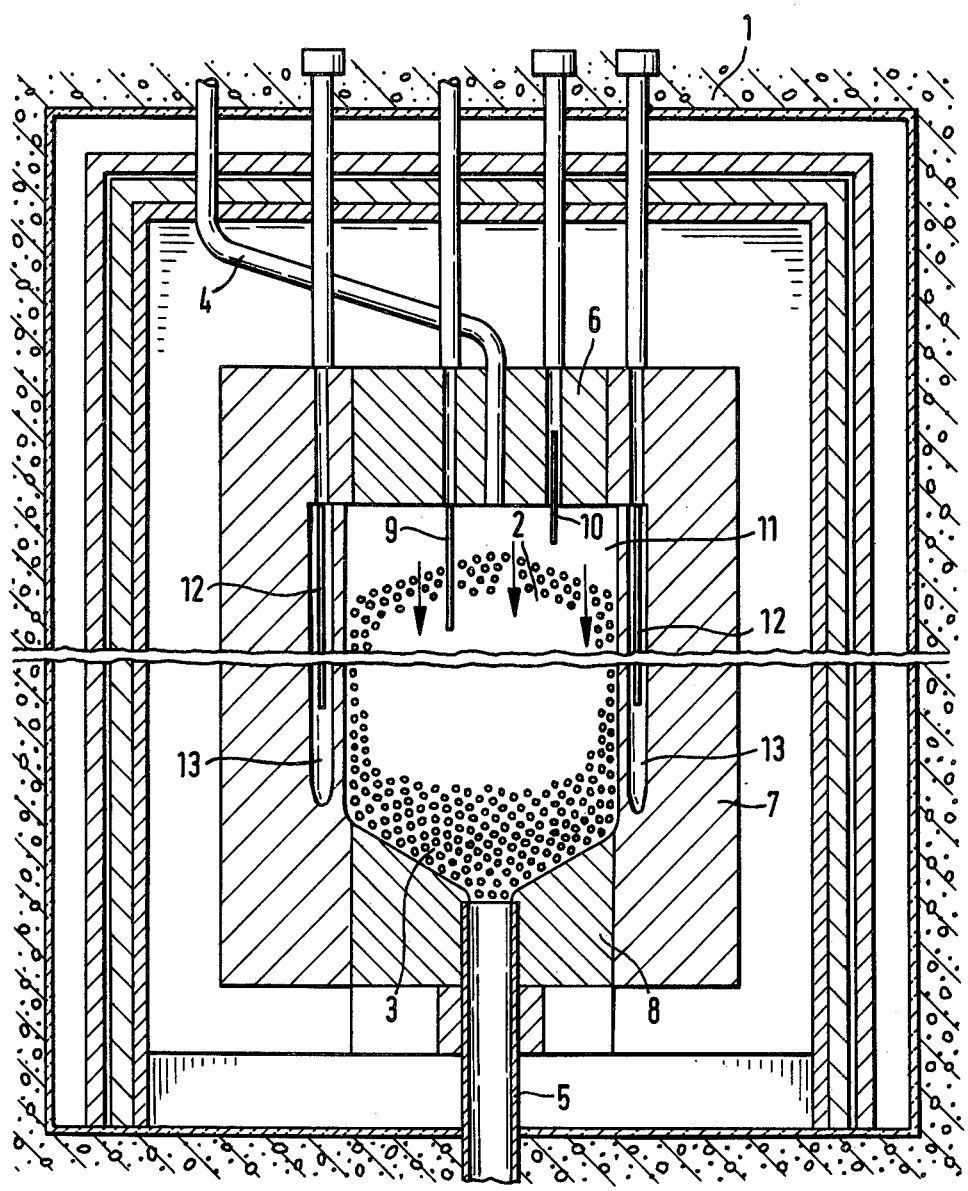
FIG. 1 is a frontal cross-sectional view of a gas-cooled nuclear reactor with spherical fuel elements according to the invention.

According to the present invention the total or long term shutdown of the nuclear reactor will be effected by a first shutdown system, which comprises absorber rods, insertable from the top into the fuel element pile, and the partial or rapid shutdown of the reactor will be effected by a second shutdown system, independent on the first, which comprises absorber rods which are movable in the top reflector and in the space formed between the top reflector and the fuel element pile. The fine adjustment and rapid load adjustment of the nuclear reactor is effected by an adjustment system, which consists of absorber rods which are inserted and movable in the side reflector.

Thus, in the process according to the invention, there are used two shutdown systems. One is represented by the shutdown device known from the prior art having absorber rods which are freely insertable into the fuel element pile. The second shutdown system comprises absorber rods, which are movable only above the fuel element pile. Both systems are independent from each other and are equipped with different operating mechanisms. Furthermore, there is arranged in the side reflector a ring of absorber rods, which accepts adjustment tasks. These absorber rods are—apart from an exception described later—always inserted in the side reflector and thus, up to a depth of 70%. They decrease the neutron flux in the side reflector and thereby protect the graphite from receiving too high of a neutron dose.

The upper final position of the absorber rods of the first shutdown system lies approximately 50 cm above the lower edge of the top reflector. For the total or long term shutdown, these absorber rods extend deeply into the combustion element pile. They are released either automatically or manually. Due to the large amount of force to be applied during the insertion and withdrawal of the absorber rods into or out of the reactor core, it is most favorable to use a pneumatic drive for these rods.

The partial or rapid shutdown system is arranged in the top reflector and is equipped with electric drives. As a result of the axial power distribution prevailing in nuclear reactors characterized by a single pass of the combustion elements, namely, those having a maximum in the upper third of the core, more than 4% $\Delta K/K$ efficiency can be reached by movement of the absorber rods of that shutdown system ($\Delta K/K$ is the deviation in percent from the multiplication factor K, measured as a percentage of this factor K). The efficiency of the second shutdown system is dependent on the surface area of each absorber rod, on the number of rods, on the rod pattern and on the height of the free space above the fuel element pile. In the partial or rapid shutdown, it must be possible to compensate for at least the reactivity existing due to a malfunction. In the case of rod accidents and water entry a malfunction excess reactivity of maximum approx. 1.5% $\Delta K/K$ arises. Therefore, altogether a total efficiency of 2.5% $\Delta K/K$ of the second shutdown system is sufficient for the partial or rapid shutdown. The devices for the after-heat removal are designed accordingly, so that the nuclear reactor will remain subcritical for more than an hour, also under unfavorable circumstances (e.g., no Xenon-135 formation to support the shutdown).

The efficiency of the second shutdown system increases with larger nuclear reactors, since nuclear reactors with spherical fuel elements are constructed with constant core depth (approx. 5–6 m), due to the high load of the rods inserted directly in the core, and therefore an increase in power will be realized by using a larger radius. In these reactors, the proportion of the neutrons which escape laterally above the fuel element pile into the side reflector which is equipped with absorber rods becomes increasingly smaller as the radius becomes larger.

As already mentioned, the absorber rods of the adjustment system are nearly always inserted in the side reflector. In case of a full load, they are always in their normal position, inserted approximately $\frac{1}{2}$–$\frac{3}{4}$ of the depth of the openings in the side reflector. They thereby bind to the Xenon-135 compensation the excess reactivity necessary for the rapid load change from full load to partial load and decrease the neutron flux in the side reflector, and thus, protect it from too high a dose. During the rapid loading change from full load to partial load they are moved out only temporarily; however, since this is effected with a decreased load in such cases of operation the reflector is likewise not exposed to a higher neutron radiation, because the neutron flux decreases proportionally with the power. Also in large nuclear reactors up to 1500 MW, it is still possible to attain reflector efficiencies of approximately 2–2.5% $\Delta K/K$, so that the absorber rods of the adjustment system can still take over the fine adjustment. Since the reflector rods in their normal position are inserted at most up to $\frac{3}{4}$ of their length in the side reflector, it is possible for fuel elements, which are exposed at first to small neutron flux near the side reflector, to afterburn in the lower part of the reactor core, whereby a constant radial outlet profile of the gas temperature will be maintained.

If the efficiency of the absorber rods of the adjustment system is not sufficient, it is possible for additional selected absorber rods of the second shutdown system to take over adjustment tasks, e.g., in the rapid loading adjustment. Since the second shutdown system can supply enough efficiency in case of appropriate design, some absorber rods of that system can be reserved for the adjustment task.

Advantageously, these reserved rods of the second shutdown system are applied for the rapid loading increase from partial load to full load, whereby a selected ring of absorber rods is used, which ring is advantageously situated at half of the radius of the reflector core.

For the rapid loading decrease from full load to partial load, the absorber rods of the adjustment system are combined advantageously in groups and are always operated in such a way that all absorber rods have nearly the same insertion depth. This is effected in such a manner that a first group of absorber rods is at first moved upwardly approximately 10 cm, afterwards a second group so on until all groups have been moved upwardly by this distance. Then, it will start over again with the first group, until all groups have moved the same distance in the same direction. In this manner a quasi-rod-bank-movement of all absorber rods of the adjustment system can be achieved. The drives of the absorber rods are preferably designed as electric drives. For a load decrease from 100%–40%, an efficiency of 1.8% $\Delta K/K$ is necessary. As already mentioned, an efficiency of 2–2.5% can be achieved with the absorber rods of the adjustment system; thus, there is still enough efficiency remaining for the fine adjustment. If more efficiency exists, the rods of the adjustment system can also be applied for the rapid loading increase.

For the excess reactivity of approximately 3.5% ΔK/K from Pa-U-233 conversion, which arises after a long term shutdown and which can be reduced again only over a long period of time (during months), a ring of absorber rods of the first shutdown system is inserted into the reactor core.

As already described, the absorber rods of the second shutdown system are equipped with electrical drives. In this regard, several absorber rods (up to three rods are suitably coupled in each case by a chain or a rope to a drive. The absorber rods are made advantageously of boron steel and have a Y-shaped cross-section. Other cross-section configurations are also usable; but a rod with a Y-shaped cross-section has the advantage of a large surface with a small cross-sectional area, so that a sufficient efficiency of the top reflector will be kept, if the absorber rods are in their upper final position (approx. 50 cm above the upper reflector edge). It is advantageous to provide the absorber rods of the second shutdown system at their upper end with a projection which is coupled with a shock absorber. The projection is formed in such a way that the absorber rods will be caught in their lower end position, in case of a rope- or chain failure, and thus, they cannot sink into the fuel element pile.

Turning now to the drawings, FIG. 1 shows a gas cooled nuclear reactor, comprising essentially a prestressed concrete vessel 1 which encloses a reactor core 2. The core 2 consists of a pile of spherical fuel elements 3, which are introduced into the core 2 by means of a feeding device (not shown in the drawing) and which leave the core through a discharge duct 5. The nuclear reactor is operated in the so-called single pass process, i.e., only fresh fuel elements are introduced into the core 2, and they are completely consumed after one pass through the core, whereupon they are removed from the core.

The core 2 itself is surrounded by a reflector which is formed by a top reflector 6, a cylindrical side reflector 7 and a bottom reflector 8. The pile of fuel elements 3 is traversed from the top to the bottom by coolant gas, which is marked by arrows (the introduction and the removal of the coolant gas is not further shown).

The shutdown of the nuclear reactor is effected by means of two shutdown systems. The first shutdown system, used for the total- or long-term shutdown, comprises a number of absorber rods 9 which are inserted directly into the fuel element pile 3. The second shutdown system, provided for the partial or rapid shutdown, consists of absorber rods 10 which are arranged in the top reflector 6 and can only be moved within that reflector and within the space 11 above the fuel element pile 3. The absorber rods 9 are pneumatically operated, and the absorber rods 10 electrically operated. The drives of the both shutdown systems are independent of each other.

The adjustment and control of the nuclear reactor is effected by means of an adjustment system, comprising a number of absorber rods 12 which are arranged in the wall of the side reflector 7. These rods are moved in special openings 13 in the side reflector 7. In their normal position they are inserted approximately 70%. They are also equipped with electrical drive means. The absorber rods 12 take over the fine adjustment task and the load reduction from full load to partial load. During the load increase from partial load to full load, they are assisted by some absorber rods 10, located in the top reflector 6, as will be described hereinbelow.

Figure 2:
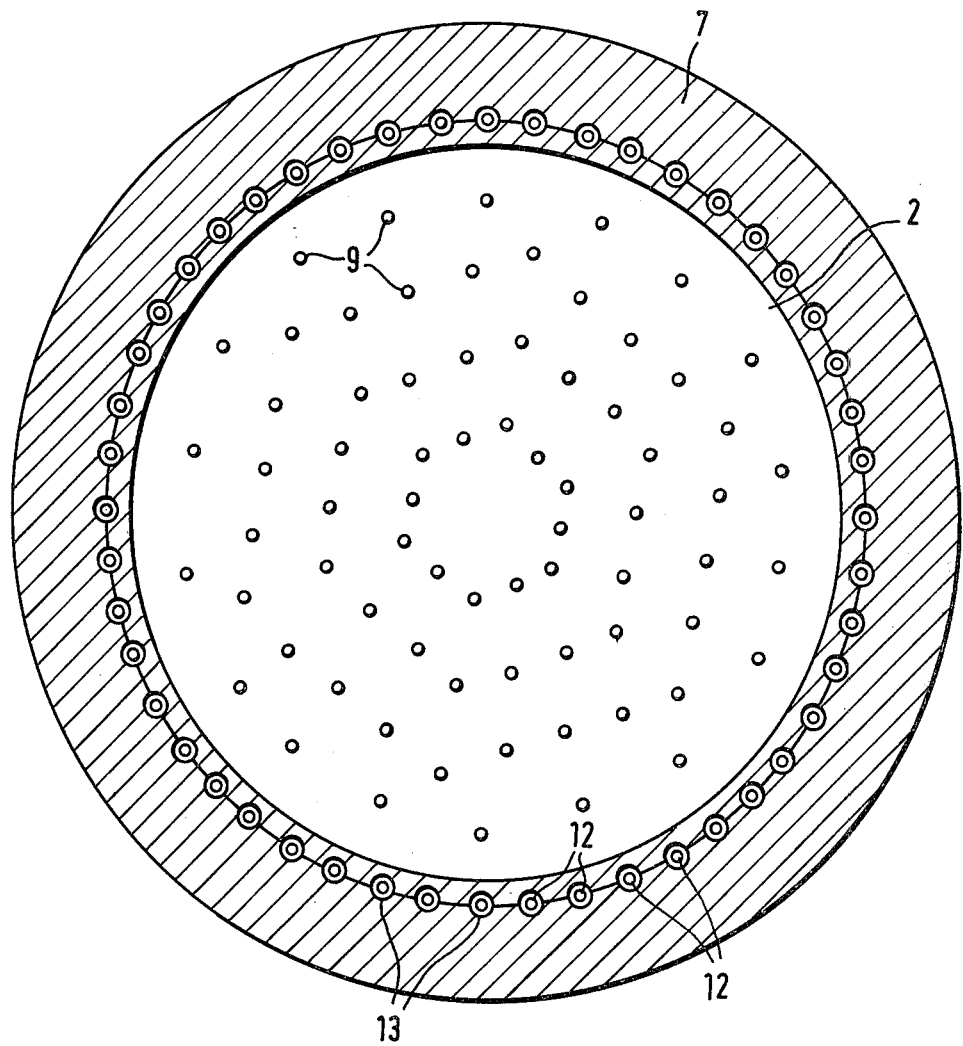
FIG. 2 is an axial cross-sectional view through the reactor core.

In FIG. 2, the positions of the absorber rods 9 of the first shutdown system as well as those of the absorber rods 12 of the adjustment system are shown. The absorber rods 9 are distributed across the total cross-section of the core 2 according to the illustrated pattern. The absorber rods 12 are arranged on a circle in the side reflector 7, spaced equidistantly.

Figure 3:
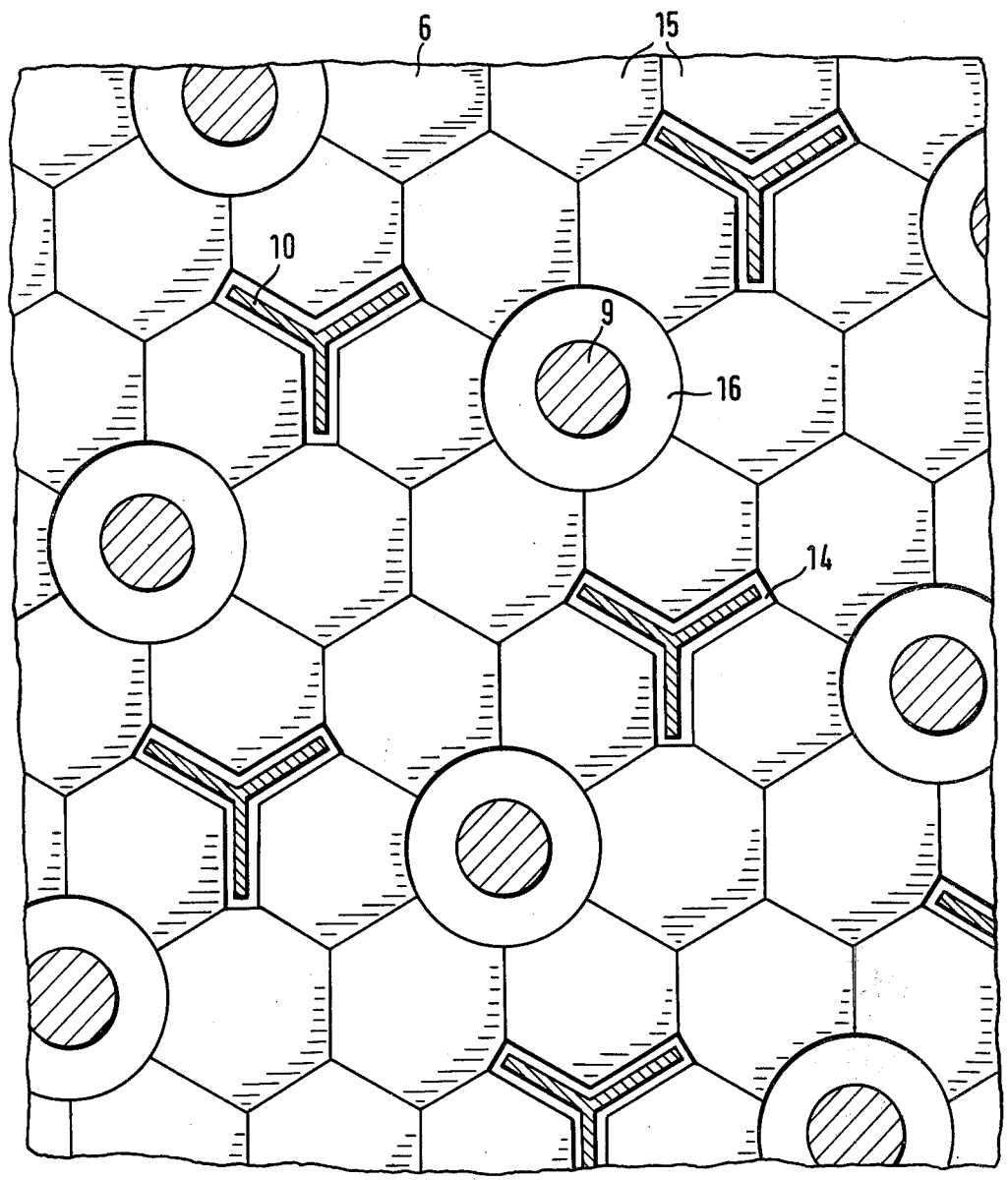
FIG. 3 is an enlarged axial cross-sectional view through the top reflector illustrating several rods.
Figure 4:
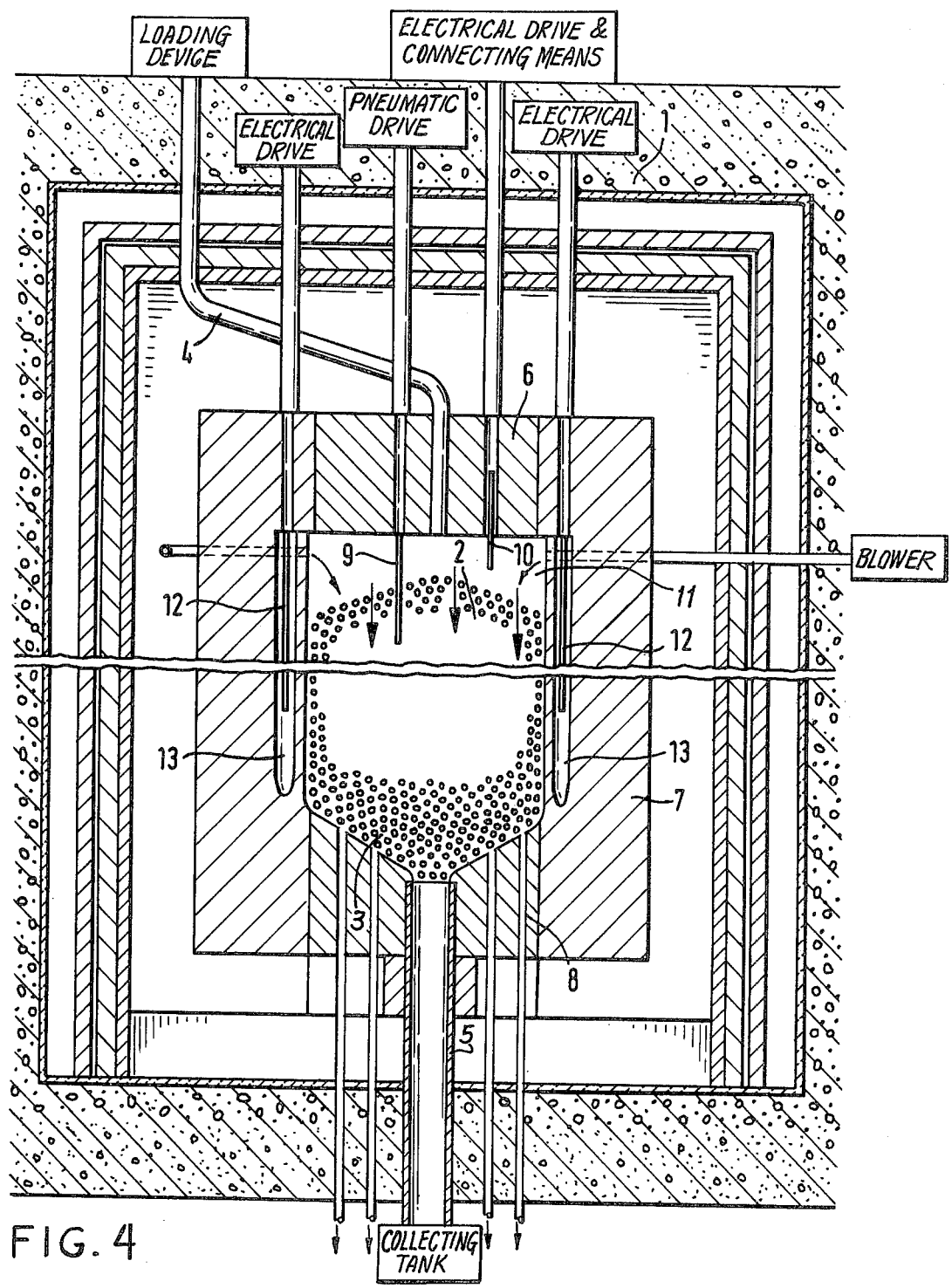
FIG. 4 is a cross-sectional view, similar to FIG. 1, illustrating schematically the various components for operation of the reactor.

In FIG. 3 the positions of the absorber rods 10 of the second shutdown system are shown. They are located between the absorber rods 9 and are distributed over the cross-section of the top reflector 6 according to a similar pattern. These absorber rods have a Y-shaped cross-section and move in openings 14 of corresponding shape in graphite blocks 15 of which top reflector 6 is formed. Openings 16 with round cross sections are provided for the absorber rods 9 in the top reflector 6.

For example, considering a 1000-MWe-nuclear reactor with a power density of 10 W/cm$^3$, the core has a radius of 3.63 m and a depth of 6.0 m. Seventy-two absorber rods 9 of the first shutdown system, having a diameter of 10 cm. are distributed across the core 2. Between them, there are seventy-two absorber rods 10 of the second shutdown system in the top reflector 6; these rods have an edge length of 10 cm and a slab thickness of 1 cm. The space 11 which is below the top reflector 6 and is free of fuel elements is 1.25 m high. In the side reflector 7 are provided forty-eight absorber rods 12 of the adjustment system. They are combined in groups of six absorber rods each and have a diameter of 10 cm.

The absorber rods 12 of the adjustment system produce 3.5% ΔK/K. The absorber rods 9 of the first shutdown system produce 24% ΔK/K and the absorber rods 10 of the second shutdown system produce 5% ΔK/K shutdown reactivity.

For the rapid loading adjustment from full load to partial load (100%–40%) 1.8% ΔK/K are necessary. To this, there is added a need for reactivity of 0.5% ΔK/K for the fine adjustment and a further 0.5% ΔK/K for compensation of fluctuations in the feeding process. Thus, there is available a shutdown reactivity of only 0.7% in the absorber rods 12 of the adjustment system. That reactivity is applied for the rapid loading adjustment from partial load to full load (40%–100%), for which there is altogether necessary approximately 1.3% ΔK/K. In order to be able to compensate the remaining 0.6% ΔK/K, there is reserved a ring of six absorber rods 10 of the second shutdown system. Since a total efficiency of the second shutdown system of 2.5% ΔK/K will be sufficient for the partial shutdown, a reservation of absorber rods 10 of this shutdown system for the rapid loading increase is possible.

What is claimed is:

1. A method for regulating and shutting-down a gas-cooled nuclear reactor of the type having a core comprising a pile of spherical fuel elements through which the cooling gas passes and which are expended after a single pass through the reactor and having a reflector surrounding the core comprising a top reflector spaced from the top of the fuel element pile to define a space therebetween, a cylindrical side reflector and a bottom reflector, said method comprising the steps of:

regulating the operation of the reactor by moving first absorber rods from above into and out of recesses provided in the side reflector;

rapidly and partially shutting down the reactor by inserting second absorber rods, independent from said first absorber rods, downwardly through the top reflector and into the space formed between the top reflector and the fuel element pile; and totally shutting-down the reactor for a long term by inserting third absorber rods, independent from said second absorber rods, downwardly through the top reflector and into the pile of fuel elements.

2. The method as defined by claim 1, wherein said regulating step is a rapid loading adjustment and further comprises inserting a portion of said second absorber rods downwardly through the top reflector and into the space formed between the top reflector and the fuel element pile.

3. The method as defined by claim 2, wherein said regulating step is in response to a load increase from a partial load to full load and comprises inserting selected ones of said second absorber rods.

4. The method as defined by claim 1, wherein said regulating step is in response to a load reduction from full load to a partial load and comprises moving groups of said first absorber rods the same distance in the same direction.

5. The method as defined by claim 1, wherein a plurality of said third absorber rods are inserted to compensate for excess reactivity existing after a long-term shutdown.

6. A gas cooled nuclear reactor for carrying-out the method defined by claim 1, comprising:
a pile of generally spherical fuel elements;
a reflector surrounding said fuel element pile, comprising a top reflector spaced from the top of said pile, a generally cylindrical side reflector and a bottom reflector;
means for continuously introducing said fuel elements into and removing same from the reactor;
means for circulating a cooling gas downwardly through the pile of fuel elements;
means, including a plurality of first absorber rods movably contained in recesses in the side reflector, for regulating the operation of the reactor;
means, including a plurality of second absorber rods, independent from said first absorber rods, distributed over the area of the top reflector and adapted to be moved through the top reflector into the pile of fuel elements, for rapidly and partially shutting-down the reactor; and
means, including a plurality of third absorber rods, independent from said second absrober rods, distributed over the area of the top reflector and adapted to be moved through the top reflector into the space formed between the top reflector and the top of the fuel element pile, for totally shutting-down the reactor for an extended period of time.

7. The nuclear reactor as defined by claim 6, wherein said partial shutdown means comprises means for electrically operating said second absorber rods to one of said operating means.

8. The nuclear reactor as defined by claim 6, wherein said second absorber rods are comprised of boron steel and comprise a Y-shaped cross-section.

9. The nuclear reactor as defined by claim 8, wherein each of said second absorber rods comprises a projection on its upper end and said partial shutdown means further comprises means, including a shock absorption element cooperating with said projection, for arresting said second absorber rods in their lowermost inserted position.

* * * * *